UNITED STATES PATENT OFFICE.

JOSEPH FELIX DESMARAIS, OF MONTREAL, QUEBEC, CANADA.

MANUFACTURE OF ALIMENTARY PRODUCTS.

1,220,205.  Specification of Letters Patent.  Patented Mar. 27, 1917.

No Drawing.  Application filed October 6, 1916.  Serial No. 124,088.

*To all whom it may concern:*

Be it known that I, JOSEPH FELIX DESMARAIS, a subject of the King of Great Britain, and residing at 1705 Chateaubriand street, in the city of Montreal, in the Province of Quebec, in the Dominion of Canada, have invented certain new and useful Improvements in the Manufacture of Alimentary Products; and I do hereby declare that the following is a full, clear, and exact description of the same.

The invention relates to an improved alimentary product of a kind such as macaroni, spaghetti, vermicelli, noodles, and so forth, and consists of the addition of powdered milk, from which the butter fat has been extracted.

Applicant is well aware that the addition of milk to flour is not new in the art of making pastry or even bread; but in the manufacture of such a product as macaroni—that is, in the manufacture of products which are dried but not baked—applicant believes that it is new and that a marked improvement in the quality of the product is thus obtained.

The object of the invention is to manufacture an alimentary product that will have highly nutritive qualities, hardly changing its taste or altering its crispness.

In the manufacture of macaroni, for example, the semolina of wheat is mixed with a small quantity of dry powdered milk, and when it is thoroughly mixed a certain quantity of water is added, in order to form dough so that it may conveniently be pressed into the proper shape to dry at a definite temperature.

To illustrate, one hundred pounds of semolina of wheat requires approximately two and a half pounds of dry powdered milk to make a proper mixture.

Instead of using dry powdered milk, it is allowable to use ordinary milk; but in manufacturing a standard product, it is necessary always to have an exact proportion of casein and the other main constituents of milk, and this can be obtained in a practical way by using dry powdered milk. In the other form, that is, by using ordinary milk, this could not be controlled, and the quality of the product would depend greatly on the quality of the milk used.

The soluble powder product made from milk contains not less than ninety-five per cent. of milk solids and not less than twenty-six per cent., milk fat. Applicant would preferably use a product known as "milk stock," which is a skimmed milk product and has a very uniform quality—that is, its percentage of milk solids and milk fat hardly varies.

In manufacturing an alimentary paste of the character described, the following proportions may also be used—semolina of wheat thoroughly mixed with two and a half per cent. of dry constituents of milk, to which is added about twenty-five per cent. of water so as to form a pasty material which may readily be pressed into different shapes, the water then being caused to evaporate from said paste by following the well-known process generally employed in manufacturing alimentary pastes.

It will easily be understood that the addition of milk, deprived of its water, to the semolina of wheat will result in an alimentary product of great nutritive qualities without interfering with the actual process followed in manufacturing same.

What I claim is:—

1. An alimentary paste composed of semolina of wheat and dry constituents of milk.

2. An alimentary paste composed of a large quantity of semolina of wheat and a smaller quantity of the dry constituents of milk.

3. An alimentary paste composed of approximately one hundred pounds of semolina of wheat mixed with two and a half pounds of dry powdered milk.

4. The process of manufacturing an alimentary paste, consisting of thoroughly mixing semolina of wheat with the dry constituents of milk in the proportion of two and a half per cent., and adding approximately twenty-five per cent. of water so as to form a pasty material which is pressed into shape, and then causing the water to evaporate from said combined semolina of wheat and constituents of milk.

Signed at Montreal, Canada, this fourteenth day of September, 1916.

JOSEPH FELIX DESMARAIS.

Witnesses:
C. PATENAUDE,
F. A. BEST.